US010970523B2

(12) United States Patent
Ahn et al.

(10) Patent No.: US 10,970,523 B2
(45) Date of Patent: Apr. 6, 2021

(54) TERMINAL AND SERVER FOR PROVIDING VIDEO CALL SERVICE

(71) Applicant: HYPERCONNECT, INC., Seoul (KR)

(72) Inventors: Sang Il Ahn, Chungcheongbuk-do (KR); Hyeok Choi, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 160 days.

(21) Appl. No.: 16/219,851

(22) Filed: Dec. 13, 2018

(65) Prior Publication Data

US 2019/0188453 A1 Jun. 20, 2019

(30) Foreign Application Priority Data

Dec. 15, 2017 (KR) .......................... 10-2017-0173116

(51) Int. Cl.
*G06K 9/00* (2006.01)
*G06N 3/08* (2006.01)
(Continued)

(52) U.S. Cl.
CPC ..... *G06K 9/00248* (2013.01); *G06K 9/00281* (2013.01); *G06K 9/00288* (2013.01); *G06K 9/6262* (2013.01); *G06K 9/6274* (2013.01); *G06N 3/08* (2013.01); *H04M 1/72555* (2013.01); *H04M 1/72577* (2013.01); *G06K 2009/00322* (2013.01); *G06K 2009/00328* (2013.01)

(58) Field of Classification Search
CPC ............. G06K 9/00248; G06K 9/6274; G06K 9/6262; G06K 9/00288; G06K 2009/00328; G06K 2009/00322; H04M 1/72577; H04M 1/72555; G06N 3/0445
See application file for complete search history.

(56) References Cited

U.S. PATENT DOCUMENTS 9,282,127 B1 * 3/2016 Burns ................... H04L 65/403
9,503,456 B1 * 11/2016 Lindberg .......... G06F 16/24578
(Continued)

FOREIGN PATENT DOCUMENTS

KR  10-2010-0138067 A  12/2010
KR  10-2011-0025718 A   3/2011
KR  10-2011-0066676 A   6/2011

OTHER PUBLICATIONS

Korean Office Action for Application No. 10-2017-0173116, dated Apr. 18, 2019.

*Primary Examiner* — Brandon J Miller
(74) *Attorney, Agent, or Firm* — Marshall, Gerstein & Borun LLP

(57) ABSTRACT

There is provided an application stored in a computer-readable storage medium for a first terminal to perform a method of providing a video call service, the method including: receiving a first video stream of a first user of the first terminal when the application that provides the video call service is executed; extracting facial feature points of the first user from the first video stream; predicting whether the first user is a bad user by applying distribution information of the facial feature points of the first user to a learning model for bad user identification based on facial feature points of a plurality of users; and controlling display of a component on an execution screen of the application based on a result of the predicting.

18 Claims, 17 Drawing Sheets

(51) Int. Cl.
*H04M 1/725* (2021.01)
*G06K 9/62* (2006.01)

(56) References Cited

U.S. PATENT DOCUMENTS

2011/0142346 A1\* 6/2011 Han .................... G06K 9/00221
  382/190
2016/0163029 A1\* 6/2016 Gibbon .............. G06K 9/00288
  382/190
2017/0308770 A1\* 10/2017 Jetley ................... G06K 9/4671

\* cited by examiner 610  620  630  640

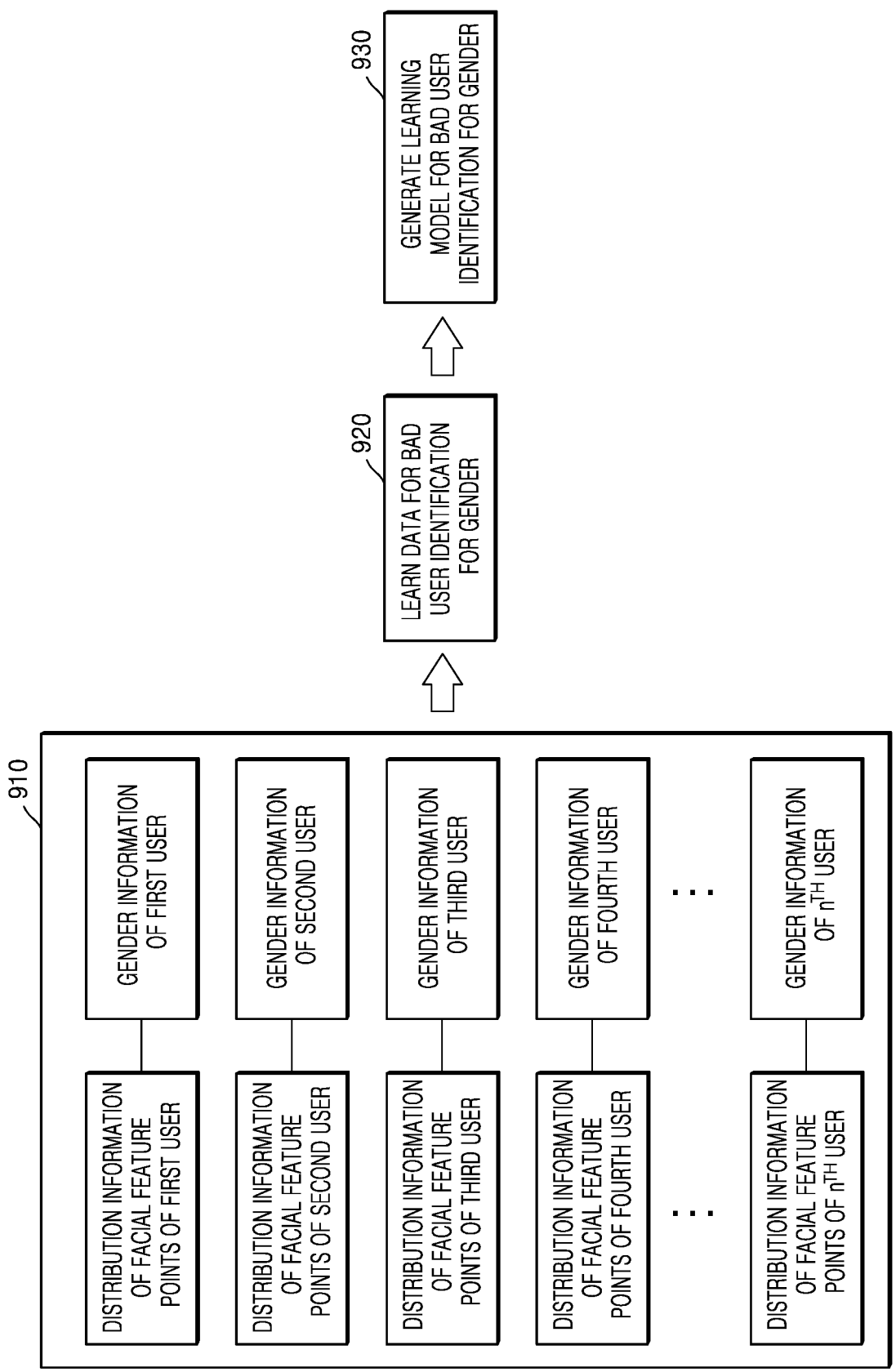

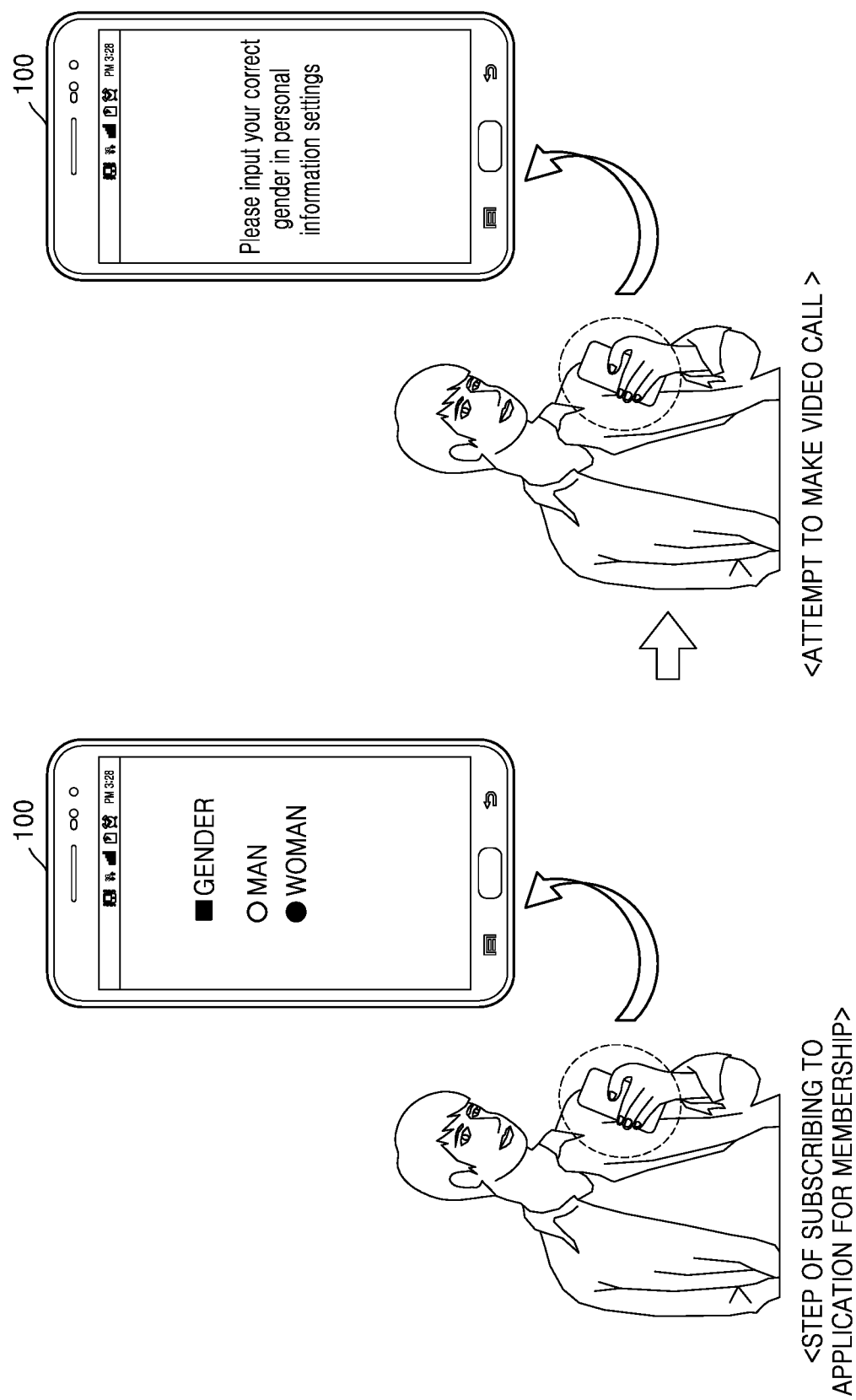

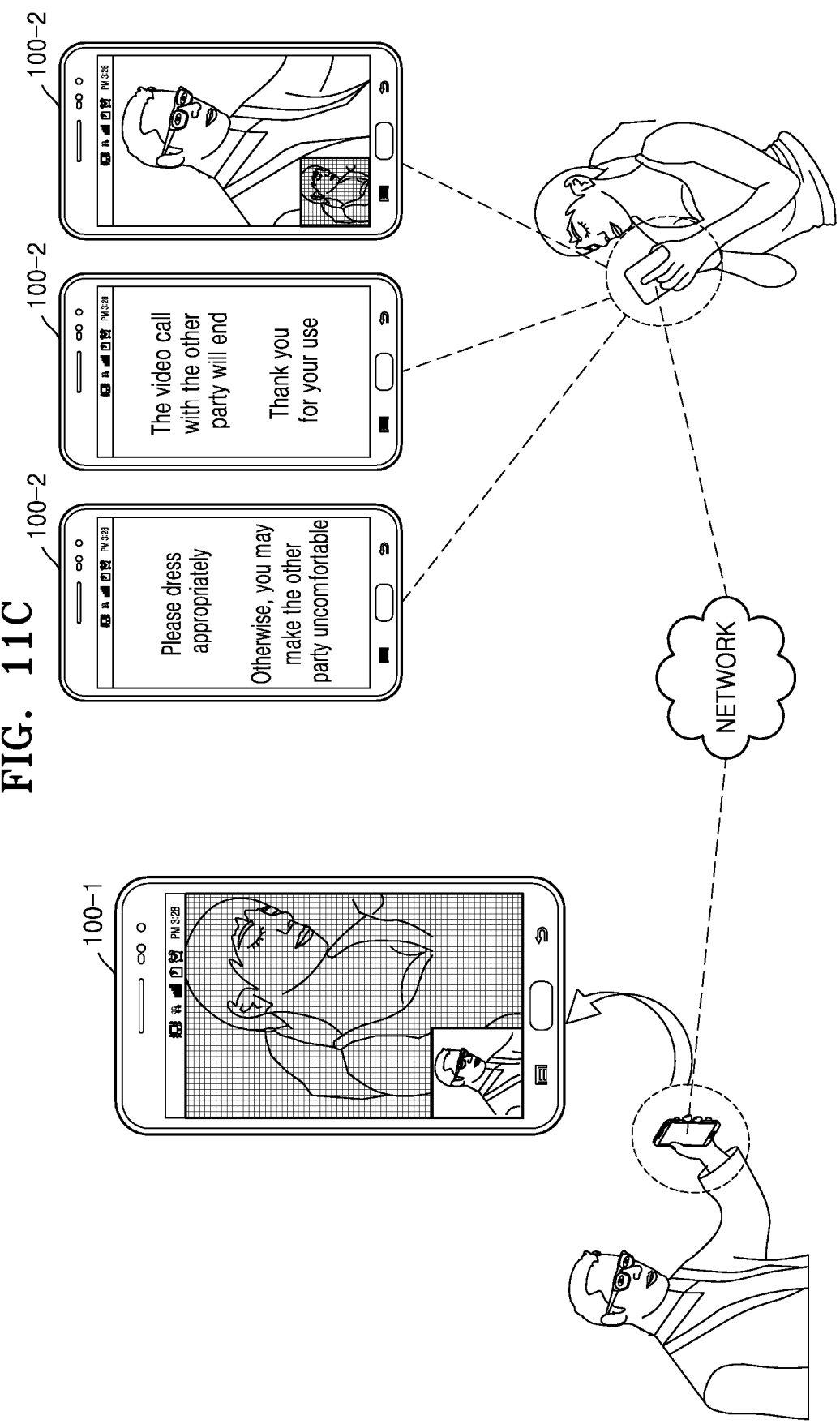

TERMINAL AND SERVER FOR PROVIDING VIDEO CALL SERVICE

CROSS-REFERENCE TO RELATED APPLICATION

This application claims the benefit of Korean Patent Application No. 10-2017-0173116, filed on Dec. 15, 2017, in the Korean Intellectual Property Office, the disclosure of which is incorporated herein in its entirety by reference.

BACKGROUND

1. Field

One or more embodiments relate to a terminal and a server for providing a video call service.

2. Description of the Related Art

With the development of science and technology, most people have their own terminals such as smartphones or tablet personal computers (PCs). Such terminals may take and play images/videos, and may communicate with other terminals to receive and transmit information from and to the other terminals or may support video calls.

Artificial intelligence (AI) systems are computer systems configured to realize human-level intelligence. Recently, AI technology is used in various fields.

In particular, the importance of AI technology is increasing in terminals and servers for providing video call services.

SUMMARY

Since a terminal more effectively detects a bad user in a video call service by applying facial feature points of a user to a learning model for bad user identification of an application that provides the video call service, user satisfaction with the video call service may be improved.

Also, since learning is performed by using distribution information of facial feature points, the amount of calculations, a calculation time, and a storage space needed to generate a learning model for bad user identification of an application that provides a video call service may be reduced.

Additional aspects will be set forth in part in the description which follows and, in part, will be apparent from the description, or may be trained by practice of the presented embodiments.

According to one or more embodiments, an application is stored in a computer-readable storage medium for a first terminal to perform a method of providing a video call service, the method including: receiving a first video stream of a first user of the first terminal when the application that provides the video call service is executed; extracting facial feature points of the first user from the first video stream; predicting whether the first user is a bad user by applying distribution information of the first facial feature points of the first user to a learning model for bad user identification based on facial feature points of a plurality of users; and controlling display of a component on an execution screen of the application based on a result of the predicting.

According to one or more embodiments, a server for providing a video call service includes: a communication interface configured to communicate with a plurality of terminals that support a video call; a storage; a processor; and a memory configured to store instructions executable by the processor, wherein the processor is configured to execute the instructions for, when an application that provides the video call service is executed in the plurality of terminals, receiving a video stream of a plurality of users respectively corresponding to the plurality of terminals from the plurality of terminals, extracting facial feature points of the plurality of users from the video stream, based on distribution information of the facial feature points of the plurality of users and information of filtering items corresponding to the distribution information of the facial feature points of the plurality of users, generating a learning model for bad user identification for the filtering items, and transmitting the generated learning model to the plurality of terminals.

According to one or more embodiments, a non-transitory computer-readable storage medium storing instructions executable by a processor includes: instructions for receiving a first video stream of a first user of a first terminal when an application that provides a video call service is executed on the first terminal; instructions for extracting facial feature points of the first user from the first video stream; instructions for predicting whether the first user is a bad user by applying distribution information of the first facial feature points of the first user to a learning model for bad user identification based on facial feature points of a plurality of users; and instructions for controlling display of a component on an execution screen of the application based on a result of the predicting.

BRIEF DESCRIPTION OF THE DRAWINGS

These and/or other aspects will become apparent and more readily appreciated from the following description of the embodiments, taken in conjunction with the accompanying drawings in which reference numerals denote structural elements and:

FIG. 9A is a diagram for describing a process of generating a learning model for bad user identification for gender, according to an embodiment;

FIG. 9B is a diagram for describing a process of detecting a bad user for gender and restricting the bad user, according to an embodiment;

FIGS. 11B and 11C are diagrams for describing a process of detecting a bad user for body exposure and restricting the bad user, according to an embodiment;

DETAILED DESCRIPTION

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail so as not to obscure the embodiments with unnecessary detail.

Throughout the specification, it will be understood that when an element is referred to as being "connected" to another element, it may be 'directly connected' to the other element or 'connected' to the other element with intervening elements therebetween. It will be further understood that when a part "includes" or "comprises" an element, unless otherwise defined, the part may further include other elements, not excluding the other elements.

It will be understood that although the terms 'first', 'second', etc. may be used herein to describe various elements, these elements should not be limited by these terms. These elements are only used to distinguish one element from another.

The present embodiments relate to a terminal and a server for providing a video call service, and what is well known to one of ordinary skill in the art is not described in detail.

Expressions such as "at least one of" when preceding a list of elements modify the entire list of elements and do not modify the individual elements of the list.

Figure 1:
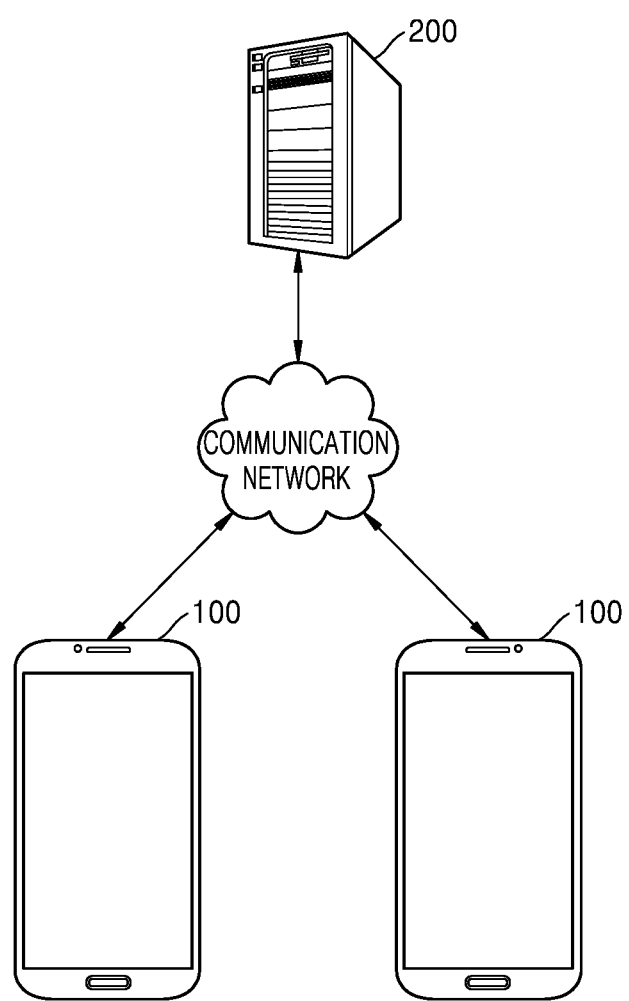
FIG. 1 is a diagram for describing an environment in which a video call service is provided.

FIG. 1 is a diagram for describing an environment in which a video call service is provided.

The term 'video call service' refers to a service by which each of a plurality of users may communicate with the other party by transmitting a video to the other party and receiving a video of the other party by using his/her terminal. Each user using a video call service may transmit/receive a video and a voice through his/her terminal, and may transmit/receive text through a chat function. A user who is to use a video call service may use the video call service with the other party by directly designating the other party or designating the other party according to a random or predetermined method of a server that provides the video call service.

Referring to FIG. 1, a terminal 100 is connected to a server 200 that provides a video call service through a communication network. The server 200 may store various programs or applications and data helping each of a plurality of users to use the video call service by using his/her terminal 100. The server 200 that provides the video call service may perform both local communication and remote communication. The server 200 that provides the video call service may be connected to a plurality of the terminals 100 through the communication network. The terminal 100 may be any of various user terminals that may be connected to the server 200 that provides the video call service. Examples of the terminal 100 that is a device for communicating with the server 200 that provides the video call service may include a wearable device such as a smart watch, a mobile device such as a smartphone, a tablet personal computer (PC), or a laptop computer, and a stationary device such as a desktop computer. Also, the terminal 100 may be a video call device for taking and playing a video so that a video call is made between users connected through the video call service.

Figure 2:
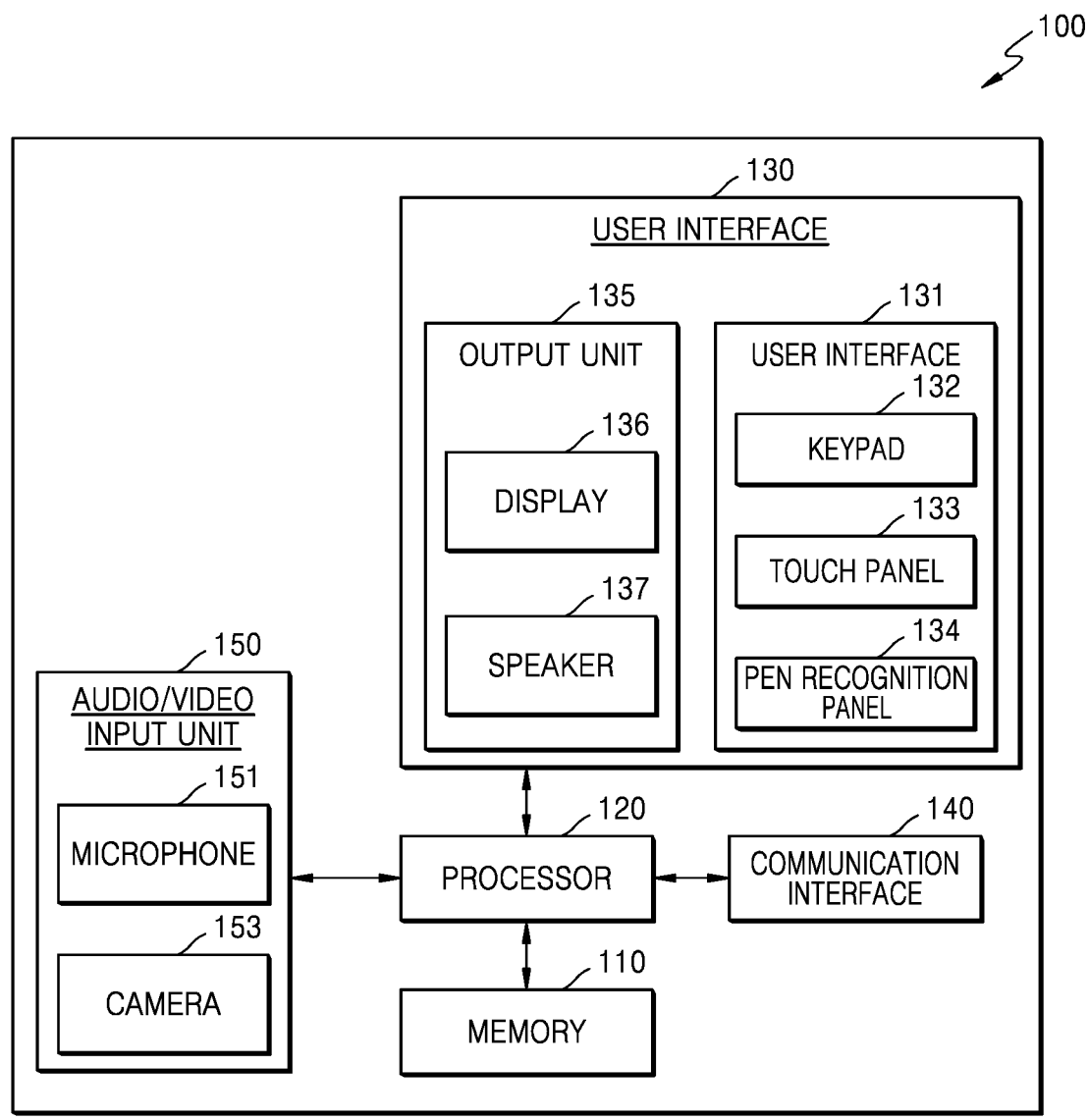
FIG. 2 is a block diagram illustrating a configuration of a terminal according to an embodiment.

FIG. 2 is a block diagram illustrating a configuration of the terminal 100 according to an embodiment.

Referring to FIG. 2, the terminal 100 may include a memory 110, a processor 120, a user interface 130, a communication interface 140, and an audio/video input unit 150. It will be understood by one of ordinary skill in the art that the terminal 100 may further include general-purpose elements other than the elements illustrated in FIG. 2.

The memory 110 may store software or programs. For example, the memory 110 may store programs such as applications or application programming interfaces (APIs) and various kinds of data. The memory 110 may store instructions executable by the processor 120.

The processor 120 may execute the instructions stored in the memory 110. The processor 120 may use various programs, content, and data stored in the memory 110, or may store new programs, content, and data in the memory 110.

The processor 120 may access the memory 110 and may perform booting by using an operating system (OS) stored in the memory 110. The processor 120 may perform various operations by using the various programs, content, and data stored in the memory 110. For example, the processor 120 may display a predetermined screen on a display 136 by using the various programs, content, and data stored in the memory 110. When a user's manipulation is performed on a portion of the display 136, the processor 120 may perform a control operation corresponding to the user's manipulation.

The processor 120 may include a graphics processing unit (GPU) specialized for graphics processing. When booting of the terminal 100 is completed, the GPU displays a user interface screen on a portion of the display 136. In detail, the GPU may generate a screen displaying a video call layout including various objects such as content, an icon, and a menu. The GPU may calculate attribute values such as coordinates at which each object will be displayed, a shape, a size, or a color according to the video call layout of the screen. The GPU may generate a screen of various layouts including the object based on the calculated attribute values. The screen generated by the GPU may be provided to the display 136 and may be displayed on each portion of the display 136.

The processor 120 may include a video processor and an audio processor. The processor 120 may control the video processor and the audio processor to respectively process video data and audio data included in a video stream received through the communication interface 140 or a video stream stored in the memory 110.

The user interface 130 may include an input unit 131 and an output unit 135.

The input unit 131 may receive various instructions from the user. The input unit 131 may include at least one of a keypad 132, a touch panel 133, and a pen recognition panel 134.

The keypad 132 may include various types of keys such as mechanical buttons and wheels formed on various portions such as a front portion, a side portion, and a rear portion of an outer surface of a main body of the terminal 100.

The touch panel 133 may detect the user's touch input and may output a touch event value corresponding to a detected touch signal. When the touch panel 133 is combined with a display panel to form a touch screen, the touch screen may be implemented as any of various touch sensors such as a capacitive sensor, a resistive sensor, or a piezoelectric sensor.

The pen recognition panel 134 may detect a proximity input or a touch input of a touch pen (e.g., a stylus pen) according to the user's operation of the touch pen and may output a detected pen proximity event or a detected pen touch event. The pen recognition panel 134 may use, for example, an electromagnetic radiation (EMR) method, and may detect a touch input or a proximity input according to a change in an intensity of an electromagnetic field when the touch pen approaches or touches. The pen recognition panel 134 may include an electromagnetic induction coil sensor having a grid structure and an electromagnetic signal processor for sequentially applying alternating current signals having a predetermined frequency to loop coils of the electromagnetic induction coil sensor.

The output unit 135 may include the display 136 and a speaker 137.

The display 136 may include a display panel and a controller for controlling the display panel. The display panel may be any of various panels such as a liquid crystal display (LCD) panel, an organic light-emitting diode (OLED) display panel, an active-matrix organic light-emitting diode (AM-OLED) display panel, or a plasma display panel (PDP). The display panel may be flexible or wearable. The display 136 may be combined with the touch panel 133 of the input unit 131 and may be provided as a touch screen.

The speaker 137 may output a sound based on audio data. For example, the speaker 137 may output the user's voice according to audio data included in a video stream.

The communication interface 140 may communicate with any of various external devices according to various communication methods. The communication interface 140 may include at least one of a Wi-Fi chip, a Bluetooth chip, a near-field communication (NFC) chip, and a wireless communication chip. The processor 120 may communicate with various external devices via the communication interface 140.

The Wi-Fi chip and the Bluetooth chip may respectively perform communication by using a Wi-Fi method and a Bluetooth method. When the Wi-Fi chip or the Bluetooth chip is used, various kinds of connection information such as a service set identifier (SSID) and a session key may be transmitted/received first, communication may be connected by using the various kinds of connection information, and then various kinds of information may be transmitted/received. The NFC chip refers to a chip that operates by using an NFC method using a frequency band of 13.56 MHz from among various radio frequency identification (RFID) frequency bands. The wireless communication chip refers to a chip that performs communication according to various communication standards such as Institute of Electrical and Electronics Engineers (IEEE), Zigbee, Third Generation (3G), Third Generation Partnership Project (3GPP), Long Term Evolution (LTE), and Fifth Generation (5G).

The audio/video input unit 150 may include a microphone 151 and a camera 153. The microphone 151 may receive the user's voice or another sound and may convert the user's voice or the other sound into audio data. The processor 120 may use the user's voice input through the microphone 151 in a video call, or may convert the user's voice into audio data and may store the audio data in the memory 110. The camera 153 may capture a still image or a moving image under the user's control. The camera 153 may be a camera module located on a front surface or a rear surface of the terminal 100. The processor 120 may generate a video stream for a video call by using a video taken by the camera 153 and a voice input through the microphone 151.

The terminal 100 may operate in a motion control mode or a voice control mode. When the terminal 100 operates in the motion control mode, the processor 120 may capture an image of the user by activating the camera 153, may track a change in the user's motion, and may perform a control operation corresponding to the change. When the terminal 100 operates in the voice control mode, the processor 120 may analyze the user's voice input through the microphone 151 and may perform a control operation according to the analyzed user's voice.

The names of elements of the terminal 100 may be changed. Also, the terminal 100 according to the present disclosure may include at least one of the elements, may not include some of the elements, or may further include other additional elements. The terminal 100 may operate as follows by using at least one of the elements.

Figure 3:
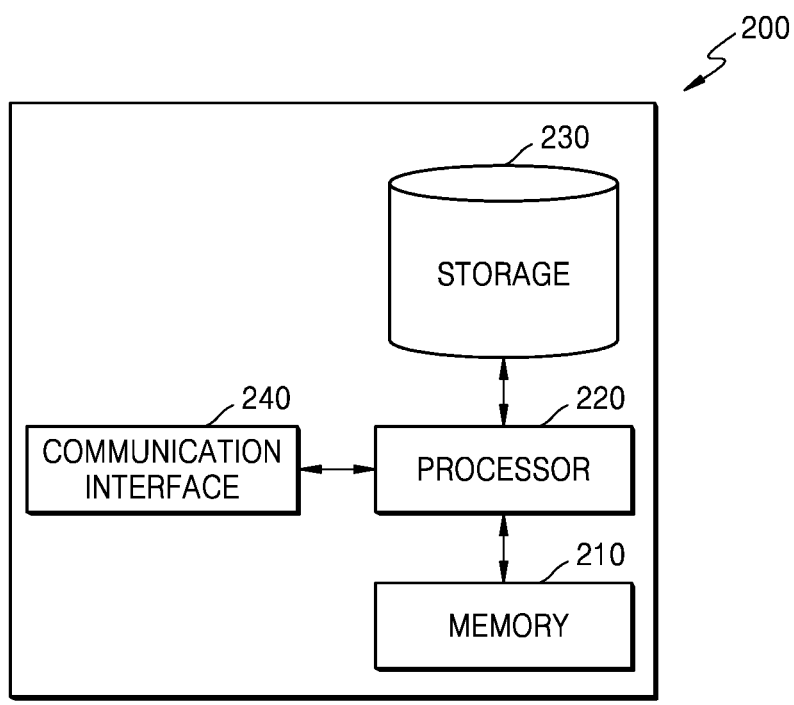
FIG. 3 is a block diagram illustrating a configuration of a server for providing a video call service, according to an embodiment.

FIG. 3 is a block diagram illustrating a configuration of the server 200 for providing a video call service, according to an embodiment.

Referring to FIG. 3, the server 200 that provides a video call service includes a memory 210, a processor 220, a storage 230, and a communication interface 240. It will be understood by one of ordinary skill in the art that the server 200 may further include general-purpose elements other than the elements illustrated in FIG. 3. Each element shown in FIG. 3 may be separated, added, or omitted according to a method of implementing the server 200 that provides the video call service. That is, one element may be divided into two or more elements, two or more elements may be combined into one element, or some elements may be further added or removed, according to the implementation method.

The memory 210 may store instructions executable by the processor 220. The memory 210 may store software or programs.

The processor 220 may execute the instructions stored in the memory 210. The processor 220 may control an overall operation of the server 200 that provides the video call service. The processor 220 may obtain information and a request received through the communication interface 240 and may store the received information in the storage 230. Also, the processor 220 may process the received information. For example, the processor 220 may generate information used for the video call service from the information received from the terminal 100, or may process the received information for management and may store the processed information in the storage 230. Also, the processor 220 may transmit information for providing the video call service to the terminal 100 through the communication interface 240 by using the information stored in the storage 230 in response to the request obtained from the terminal 100.

The storage 230 may store various kinds of software and information needed for the server 200 to provide the video call service. For example, the storage 230 may store programs and applications executed by the server 200 that provides the video call service and various kinds of data used in the video call service.

The storage 230 may store and manage personal information of video call service users in a database. The storage 230 may store various kinds of information used in the video call service and users' personal information by accounts used to access the server 200 that provides the video call service.

The communication interface 240 may communicate with external devices including the terminal 100. For example, the server 200 that provides the video call service may receive a video call service initiation request and a request for configuration information for setting a video call service environment from the terminal 100, and may provide all items related to the video call service in response to the request of the terminal 100.

Figure 4:
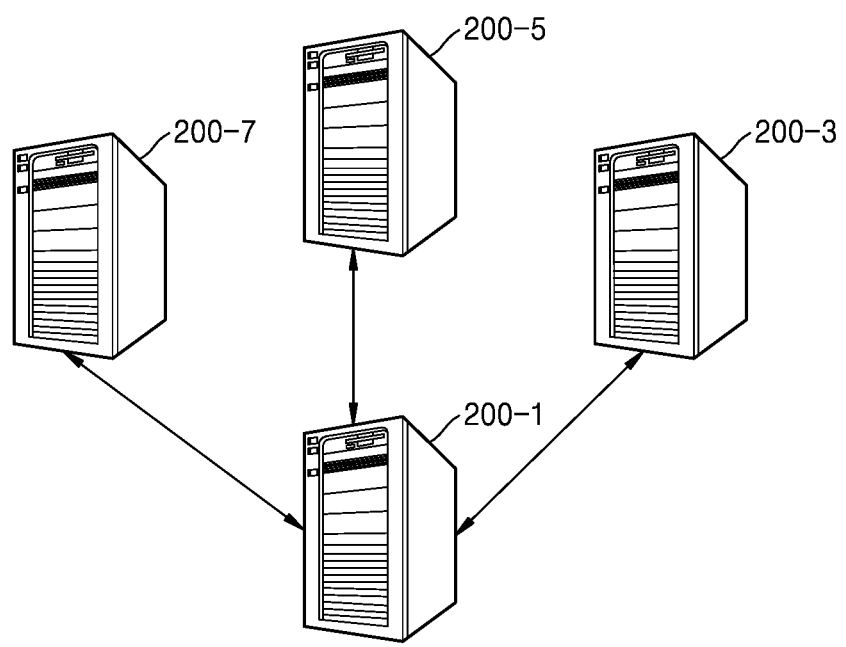
FIG. 4 is a diagram for describing an example where the server that provides a video call service includes a plurality of distributed servers, according to another embodiment.

FIG. 4 is a diagram for describing an example where the server 200 that provides a video call service includes a plurality of distributed servers, according to another embodiment. Although omitted, the description already made for the server 200 that provides the video call service may be applied below.

Referring to FIG. 4, the distributed servers that provide a video call service may include a load balancing server 200-1 and functional servers 200-3, 200-5, and 200-7 that provide the video call service. When there is a video call service request of an external device such as the terminal 100, the load balancing server 200-1 may determine any of the functional servers 200-3, 200-5, and 200-7 that provide the video call service and may connect the selected server to the terminal 100, or may monitor states of the functional servers 200-3, 200-5, and 200-7 that provide the video call service, may select an optimal server, and may connect the optimal server to the terminal 100.

A first terminal 100 of FIGS. 5 through 13 may include the memory 110, the processor 120, the user interface 130, the communication interface 140, and the audio/video input unit 150 of the terminal 100 of FIG. 2 and may perform the same operation as that of the terminal 100 of FIG. 2.

Also, the server 200 of FIGS. 5 through 13 may include the memory 210, the processor 220, the storage 230, and the communication interface 240 of the server 200 of FIG. 3 and may perform the same operation as that of the server 200 of FIG. 3.

Various operations or applications performed by the first terminal 100 and the server 200 will now be described with reference to FIGS. 5 through 13. It will be understood by one of ordinary skill in the art that even when any of the memory 110, the processor 120, the user interface 130, the communication interface 140, and the audio/video input unit 150 of the first terminal 100, and the memory 210, the processor 220, the storage 230, and the communication interface 240 of the server 200 is not specified, each operation or application that may be clearly understood and expected by one of ordinary skill in the art may be understood as typical implementation and the scope of the first terminal 100 and the server 200 is not limited by names or physical/logical structures of specific elements.

Figure 5:
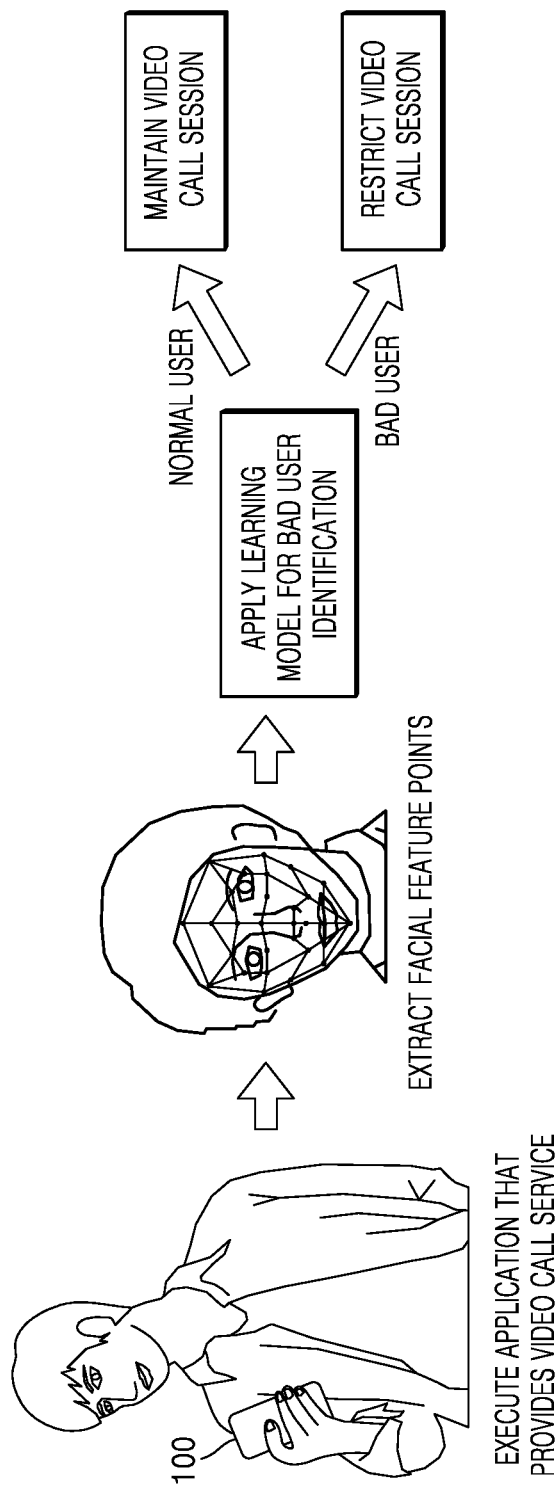
FIG. 5 is a diagram for describing a process of predicting whether a user is a bad user by using facial feature points of the user, according to an embodiment.

FIG. 5 is a diagram for describing a process of predicting whether a user is a bad user by using facial feature points of the user, according to an embodiment.

Referring to FIG. 5, a first user may execute an application that provides a video call service (hereinafter, referred to as 'application') on the first terminal 100 of the first user. When the application of the first terminal 100 is executed, the first terminal 100 may display pieces of information required for a video call on a display of the first terminal 100 so that the video call of the first user is made with a second terminal of a second user who is the other party of the video call. For example, the first terminal 100 may display an execution screen requesting that a frontal face image of the first user be captured in order for the first user to log into the application. Alternatively, the first terminal 100 may display an execution screen requesting that a frontal face image of the first user be captured so that the video call between the first terminal 100 of the first user and the second terminal of the second user is made through the application. The first terminal 100 may obtain a video or a video stream of the first user through a camera of the first terminal 100. The video stream may include at least one video.

The first terminal 100 may extract facial feature points of the first user from the video or the video stream of the first user based on a predetermined image processing algorithm. The facial feature points may be obtained from a specific shape, a pattern, a color, or a combination thereof in a facial image. Also, the predetermined image processing algorithm may be one of, but not limited to, scale-invariant feature transform (SIFT), histogram of oriented gradient (HOG), Haar feature, Ferns, local binary pattern (LBP), and modified census transform (MCT).

For example, the first terminal 100 may extract feature points of at least one of eyes, nose, mouth, forehead, and chin that are facial parts of the first user from the video stream of the first user based on an LBP algorithm.

The first terminal 100 may predict whether the first user is a bad user by applying the facial feature points of the first user to a learning model for bad user identification of the application. The term "learning model" may be a data recognition model used to detect a bad user from among users using the application. The data recognition model may be a model based on an artificial neural network. For example, a model such as, but not limited to, deep neural network (DNN), recurrent neural network (RNN), or bidirectional recurrent deep neural network (BRDNN) may be used as the data recognition model.

The "learning model for bad user identification" may be trained by using distribution information of facial feature points of a plurality of users and information of filtering items corresponding to the distribution information of the facial feature points of the plurality of users.

The term "filtering items" may be items which users of the application have to follow while using the application. For example, the filtering items may include at least one of, but not limited to, gender, age, body exposure degree, and swearword frequency. Also, the information of the filtering items indicates information about the filtering items. For example, when the filtering items are the body exposure degree, the information of the filtering items may be information indicating a body exposure level when a user uses the application. Alternatively, when the filtering items are the swearword frequency, the information of the filtering items may be information indicating a frequency of a swearword or an action that may be considered an insult when a user uses the application. Also, swearword frequency information may be determined by a frequency at which a user performs at least one of a swearing gesture, an insulting gesture, a racial discrimination gesture, anti-social content, inhumane content, a violent act, and an abusive act, during the video call through the application.

The first terminal 100 may prepare the learning model for bad user identification for predetermined filtering items. The learning model for bad user identification for the predetermined filtering items may be trained based on a correlation between the distribution information of the facial feature points of the plurality of users and information of the predetermined filtering items corresponding to the distribution information of the facial feature points of the plurality of users through the artificial neural network.

The first terminal 100 may prepare the learning model for bad user identification for the predetermined filtering items by using any of two methods.

For example, the first terminal 100 may directly learn the correlation between the distribution information of the facial feature points of the plurality of users and the information of the predetermined filtering items corresponding to the facial feature points of the plurality of users through the artificial neural network. The first terminal 100 may generate the learning model for bad user identification for the predetermined filtering items by training the artificial neural network based on a result of the learning.

Alternatively, the first terminal 100 may receive the learning model for bad user identification for the predetermined filtering items from the server 200. In this case, the server 200 may generate the learning model for bad user identification for the predetermined filtering items.

The first terminal 100 may learn distribution information of the facial feature points of the first user according to the learning model for bad user identification for the predetermined filtering items by using the artificial neural network. The first terminal 100 may predict whether the first user is a bad user for the predetermined filtering items based on a result of the learning.

Also, the first terminal 100 may extract feature points of at least one of eyes, nose, mouth, forehead, and chin that are facial parts of the first user from a first video stream. The first terminal 100 may predict whether the first user is a bad user by applying distribution information of feature points of one of the facial parts of the first user to the learning model for bad user identification for the predetermined filtering items. Also, the first terminal 100 may predict whether the first user is a bad user by applying distribution information of feature points of a combination of at least two of the facial parts of the first user to the learning model for bad user identification for the predetermined filtering items.

Also, the information of the filtering items may include at least one of gender information, age information, body exposure information, and swearword frequency information. When the information of the filtering items includes information of at least two item, the first terminal 100 may predict whether the first user is a bad user for each of the filtering items by applying the distribution information of the facial feature points of the first user to the learning model for bad user identification for each of the filtering items.

A method of generating the learning model for bad user identification for the predetermined filtering items and detecting a bad user for the predetermined filtering items by using the generated learning model will be described in detail with reference to FIGS. 9 through 11.

The first terminal 100 may control display of a component on an execution screen of the application based on a result obtained after predicting whether the user is a bad user.

For example, when it is predicted that the first user is a normal user, the first terminal 100 may continuously maintain a video call session between the first terminal 100 and the second terminal. Also, the first terminal 100 may determine whether the first user is a bad user by repeatedly, in real time or a predetermined cycle, inspecting the video stream of the first user.

Alternatively, when it is predicted that the first user is a bad user, the first terminal 100 may display a warning message on the execution screen of the application. Also, the first terminal 100 may mosaic and display an area where the first user is output on the execution screen of the application. Also, the first terminal 100 may automatically end the video call session established between the first terminal 100 and the second terminal.

Figure 6:
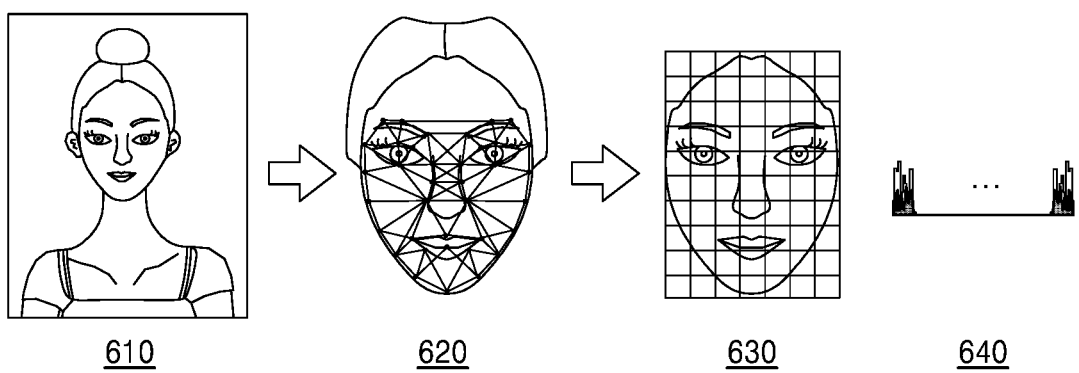
FIG. 6 is a diagram for describing a process of obtaining distribution information of facial feature points from a facial image of a user, according to an embodiment.

FIG. 6 is a diagram for describing a process of obtaining distribution information of facial feature points from a facial image of a user, according to an embodiment.

The first terminal 100 may extract facial feature points of the first user from a video or a video stream of the first user.

Referring to 610 of FIG. 6, the first terminal 100 may extract feature points of at least one of eyes, nose, mouth, forehead, and chin that are facial parts of the first user from the video or the video stream of the first user.

Referring to 620 of FIG. 6, the first terminal 100 may extract only a facial area of the first user from the video or the video stream of the first user.

Referring to 630 and 640 of FIG. 6, the first terminal 100 may obtain a feature vector from feature points in the extracted facial area. The first terminal 100 may divide the facial area into n×n blocks and may obtain a histogram of gradient directions and sizes of pixels included in each block. The first terminal 100 may obtain a feature vector from values of the obtained histogram. The first terminal 100 may obtain distribution information of the facial feature points of the first user based on the feature vector.

A method of obtaining the distribution information of the facial feature points of the first user of FIG. 6 is an example, and the distribution information of the facial feature points of the first user may be obtained by using any of other well-known methods. For example, the first terminal may obtain the distribution information of the facial feature points of the first user from a facial image of the first user by combining at least one of SIFT, HOG, Haar feature, Ferns, LBP, and MCT.

Figure 7:
FIG. 7 is a diagram for describing a process of generating a learning model for bad user identification by collecting information of a plurality of users and learning the information of the plurality of users, according to an embodiment.

FIG. 7 is a diagram for describing a process of generating a learning model for bad user identification by collecting information of a plurality of users and learning the information of the plurality of users, according to an embodiment.

An artificial intelligence (AI) system may be used to generate or update a learning model for bad user identification according to the present disclosure.

An AI system is a system in which a computer machine configured to realize human-level intelligence improves accuracy by self-learning and making a decision.

The more an AI system is used, the more the accuracy of its calculation result improves and the more accurately it reflects a user's intention through repeated learning, and thus existing rule-based smart systems are gradually being replaced by deep learning-based AI systems.

AI technology may be a technology using machine learning, and deep learning may be part of machine learning. Deep learning is algorithm technology that self-classifies and learns characteristics of input data. Element technologies are technologies using a machine learning algorithm such as deep learning to simulate functions of the human brain such as recognition and decision-making, and include technical fields such as linguistic understanding, visual understanding, inference/prediction, knowledge representation, and motion control.

A process of generating a learning model for bad user identification of an application by using an AI system using an artificial neural network will now be described.

As an application that provides a video call service is executed on a plurality of terminals, the server 200 that provides the video call service (hereinafter, referred to as 'server 200') may receive a video stream of a plurality of users corresponding to a plurality of terminals from the plurality of terminals.

The server 200 may extract facial feature points of the plurality of users from the video stream. The server 200 may generate a learning model for bad user identification for filtering items based on distribution information of the facial feature points of the plurality of users and information of filtering items corresponding to the distribution information of the facial feature points of the plurality of users. The information of the filtering items may include at least one of gender information, age information, body exposure degree information, and swearword frequency information of the plurality of users.

For example, the server 200 may learn a correlation between the distribution information of the facial feature points of the plurality of users and the information of the filtering items corresponding to the distribution information of the facial feature points of the plurality of users by performing a calculation through an artificial neural network. The server 200 may generate the learning model for bad user identification for the filtering items by training the artificial neural network based on a result of the learning.

In detail, the server 200 may generate the learning model for bad user identification of an application through the artificial neural network that is a neural network used in the field of AI. The artificial neural network having a structure similar to a human neural network may generate the learning model for bad user identification for predetermined filtering items by calculating, through a plurality of layers, the distribution information of the facial feature points of the plurality of users and the information of the filtering items corresponding to the distribution information of the facial feature points of the plurality of users, performing learning based on values obtained as a calculation result, and reducing an error range according to a result of the learning.

Also, the server 200 may update the learning model for bad user identification for the predetermined filtering items by learning bad user identification histories of the plurality of users for the predetermined filtering items.

A terminal may also generate the learning model for bad user identification by performing the same operation as that of the server 200. Also, the terminal may receive the learning model for bad user identification for the predetermined filtering items from the server 200.

Figure 8:
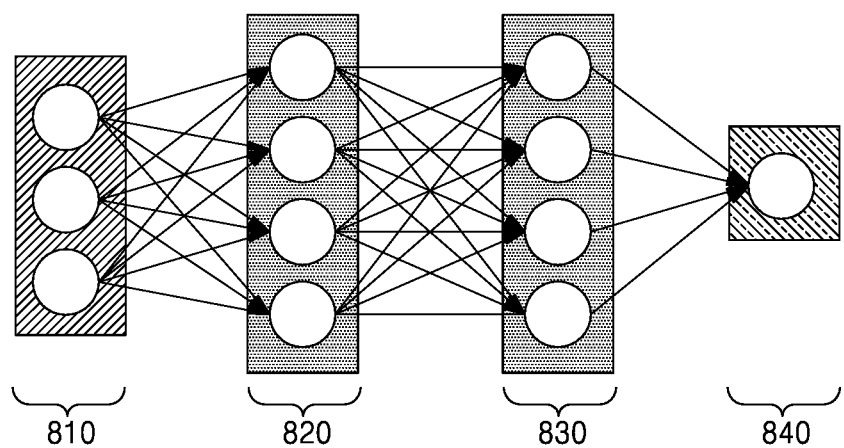
FIG. 8 is a diagram for describing an artificial neural network having a multi-layer structure, according to an embodiment.

FIG. 8 is a diagram for describing an artificial neural network having a multi-layer structure, according to an embodiment.

Referring to FIG. 8, an artificial neural network may include an input layer 810, one or more hidden layers 820 and 830, and an output layer 840. Also, a calculation through the artificial neural network may be performed by the processor 120 in the terminal 100 or the processor 220 in the server 200. Alternatively, the terminal 100 and the server 200 may perform a calculation through an additional artificial neural network by using an additional processor, controller, or chip.

Also, a weight between each layer and a node may be learned through learning and training performed by the hidden layers 820 and 830. For example, the processor 120 in the terminal 100 or the processor 220 in the server 200 may obtain a weight applied to each of distribution information of facial feature points of a plurality of users and information of predetermined filtering items corresponding to the distribution information of the facial feature points of the plurality of users through repeated learning. The processor 120 in the terminal 100 or the processor 220 in the server 200 may generate a learning model for bad user identification for predetermined items in the trained artificial neural network by applying again the obtained weight to the distribution information of the facial feature points of the plurality of users and the information of the predetermined filtering items corresponding to the distribution information of the facial feature points of the plurality of users.

FIG. 9A is a diagram for describing a process of generating a learning model for bad user identification for gender, according to an embodiment.

Referring to 910 of FIG. 9A, the server 200 may receive a video or a video stream of the face of a user from each of a plurality of terminals. Also, the server 200 may receive gender information corresponding to distribution information of facial feature points of the user from each of the plurality of terminals. The gender information is information indicating whether the user is a man or a woman. The server 200 may obtain distribution information of facial feature points of a plurality of users based on the received video or video stream. The server 200 may store the distribution information of the facial feature points of the plurality of users and gender information corresponding to the distribution information of the facial feature points of the plurality of users in the storage 230 of the server 200.

For example, the server 200 may store the distribution information of the facial feature points of each of the plurality of users and information indicating whether each of the plurality of users is a man or a woman. The information indicating whether each of the plurality of users is a man or a woman may be paired with the distribution information of the facial feature points of each of the plurality of users and may be stored.

Alternatively, the server 200 may store the distribution information of the facial feature points of each of the plurality of users, gender information input when each of the plurality of users subscribes or logs into the application, and actual gender information of each of the plurality of users. Also, the server 200 may store information indicating whether the gender information input when each of the plurality of users subscribes or logs into the application is the same as the actual gender information of each of the plurality of users. The distribution information of the facial feature points of each of the plurality of users may be paired with the gender information input when each of the plurality of users subscribes or logs into the application and the actual gender information of each of the plurality of users and may be stored.

Referring to 920 of FIG. 9A, the server 200 may learn a correlation between the distribution information of the facial feature points of the plurality of users and the gender information corresponding to the distribution information of the facial feature points of the plurality of users by calculating information stored in the storage 230 through an artificial neural network. In detail, the server 200 may learn a correlation between distribution information of facial feature points of a $k^{th}$ user and gender information of the $k^{th}$ user (k=1, 2, 3, 4, 5, . . . , n). That is, the server 200 may calculate, through a plurality of layers, input distribution information of facial feature points and gender information corresponding to the input distribution information of the facial feature points and may perform learning based on values obtained as a calculation result.

Referring to 930 of FIG. 9A, the server 200 may generate a learning model for bad user identification for gender by training the artificial neural network based on a result of the learning. That is, the server 200 may generate the learning model for bad user identification for gender by reducing an error range according to the result of the learning. Also, the server 200 may update the learning model for bad user identification for gender by learning bad user identification histories of the plurality of users for gender. The learning model for bad user identification for gender may determine whether the first user is a bad user for gender by using only distribution information of facial feature points of the first user.

FIG. 9B is a diagram for describing a process of detecting a bad user for gender and restricting the bad user, according to an embodiment.

Referring to FIG. 9B, at a step of subscribing to an application of the first user of the first terminal 100 for a membership, the first terminal 100 may display an execution screen for receiving gender information of the first user. The first user may input gender information other than his/her gender information on the execution screen. For example, although the first user is a man, the first user may input woman as gender information on the execution screen through which the gender information is input.

Next, the first user of the first terminal 100 may attempt to make a video call with a user of a second terminal on the execution screen of the application. In this case, the first terminal may request the first user of the first terminal 100 for a facial image on the execution screen of the application in order to establish a video call session with the second terminal. According to the request for the facial image, when the first terminal 100 obtains the facial image of the first user, the first terminal 100 may extract facial feature points of the first user from the facial image of the first user. The first terminal 100 may predict that the first user is a bad user for gender by applying distribution information of the facial feature points of the first user to a learning model for bad user identification for gender. According to a result of the predicting, the first terminal 100 may display a warning message on the execution screen of the application. As shown in FIG. 9B, the first terminal 100 may display a message with the phrase "Please input your correct gender in personal information settings".

Figure 10A:
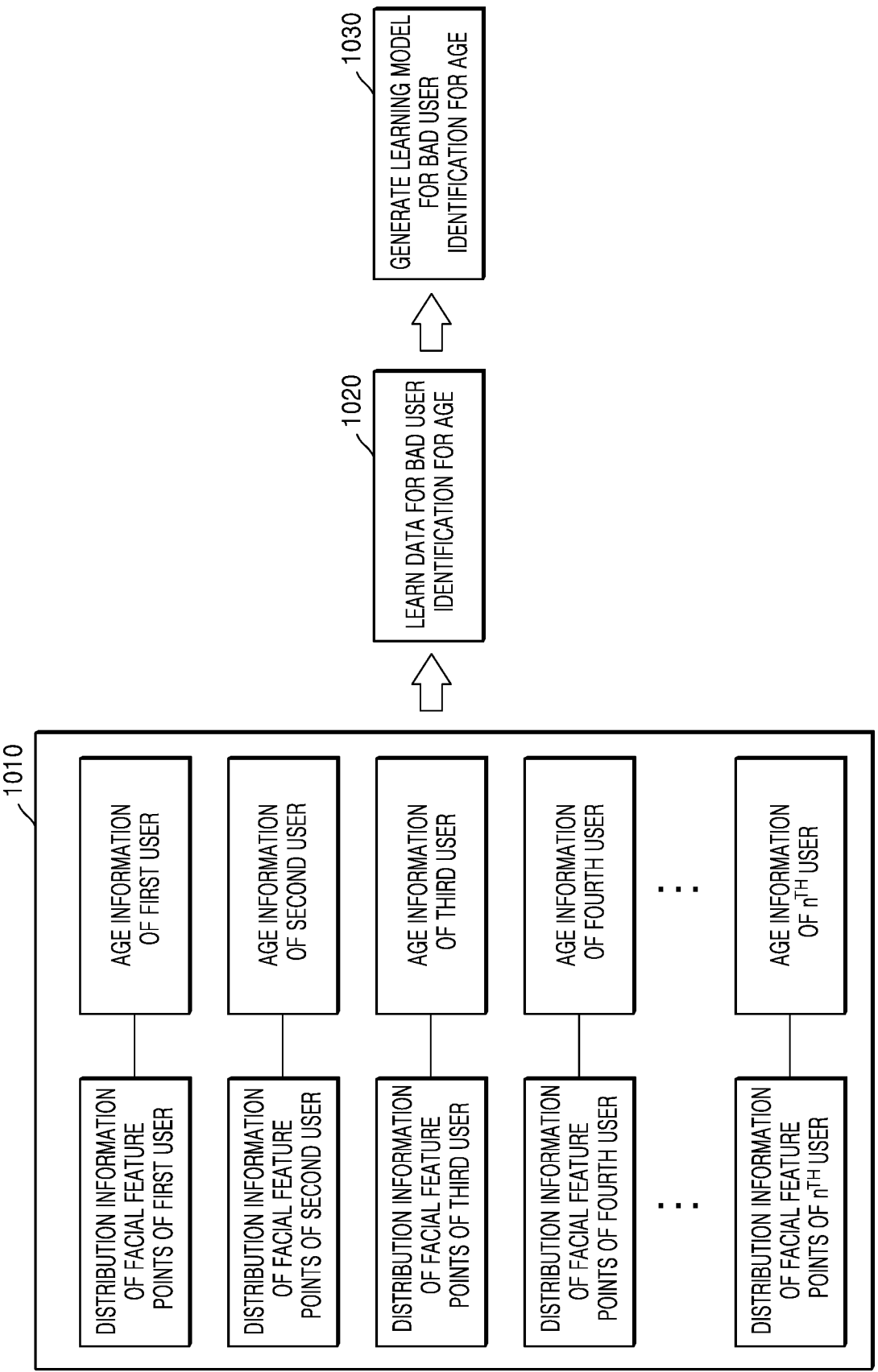
FIG. 10A is a diagram for describing a process of generating a learning model for bad user identification for age, according to an embodiment.

FIG. 10A is a diagram for describing a process of generating a learning model for bad user identification for age, according to an embodiment.

Referring to 1010 of FIG. 10A, the server 200 may receive a video or a video stream of the face of a user from each of a plurality of terminals. Also, the server 200 may receive age information corresponding to distribution information of facial feature points of the user from each of the plurality of terminals. The server 200 may obtain distribution information of facial feature points of a plurality of users based on the received video or video stream. The server 200 may store the distribution information of the facial feature points of the plurality of users and age information corresponding to the distribution information of the facial feature points of the plurality of users in the storage 230 of the server 200.

For example, the server 200 may store the distribution information of the facial feature points of each of the plurality of users and the age information of each of the plurality of users. The age information of each of the plurality of users may be paired with the distribution information of the facial feature points of each of the plurality of users and may be stored.

Alternatively, the server 200 may store the distribution information of the facial feature points of each of the plurality of users, age information input when each of the plurality of users subscribes or logs into the application, and actual age information of each of the plurality of users. Also, the server 200 may store information indicating whether the age information input when each of the plurality of users subscribes or logs into the application is the same as the actual age information of each of the plurality of users. The distribution information of the facial feature points of each of the plurality of users may be paired with the age information input when each of the plurality of users subscribes or logs into the application and the actual age information of each of the plurality of users and may be stored.

Referring to 1020 of FIG. 10A, the server 200 may learn a correlation between the distribution information of the facial feature points of the plurality of users and the age information corresponding to the distribution information of the facial feature points of the plurality of users by calculating information stored in the storage 230 through an artificial neural network. In detail, the server 200 may learn a correlation between distribution information of facial feature points of a $k^{th}$ user and age information of the $k^{th}$ user (k=1, 2, 3, 4, 5, . . . , n). That is, the server 200 may calculate, through a plurality of layers, input distribution information of facial feature points and age information corresponding to the input distribution information of the facial feature points and may perform learning based on values obtained as a calculation result.

Referring to FIG. 1030 of FIG. 10A, the server 200 may generate a learning model for bad user identification for age by training the artificial neural network based on a result of the learning. That is, the server 200 may generate the learning model for bad user identification for age by reducing an error range according to the result of the learning. Also, the server 200 may update the learning model for bad user identification for age by learning bad user identification histories of the plurality of users for age. The learning model for bad user identification for age may determine whether the first user is a bad user for age by using only distribution information of facial feature points of the first user.

Figure 10B:
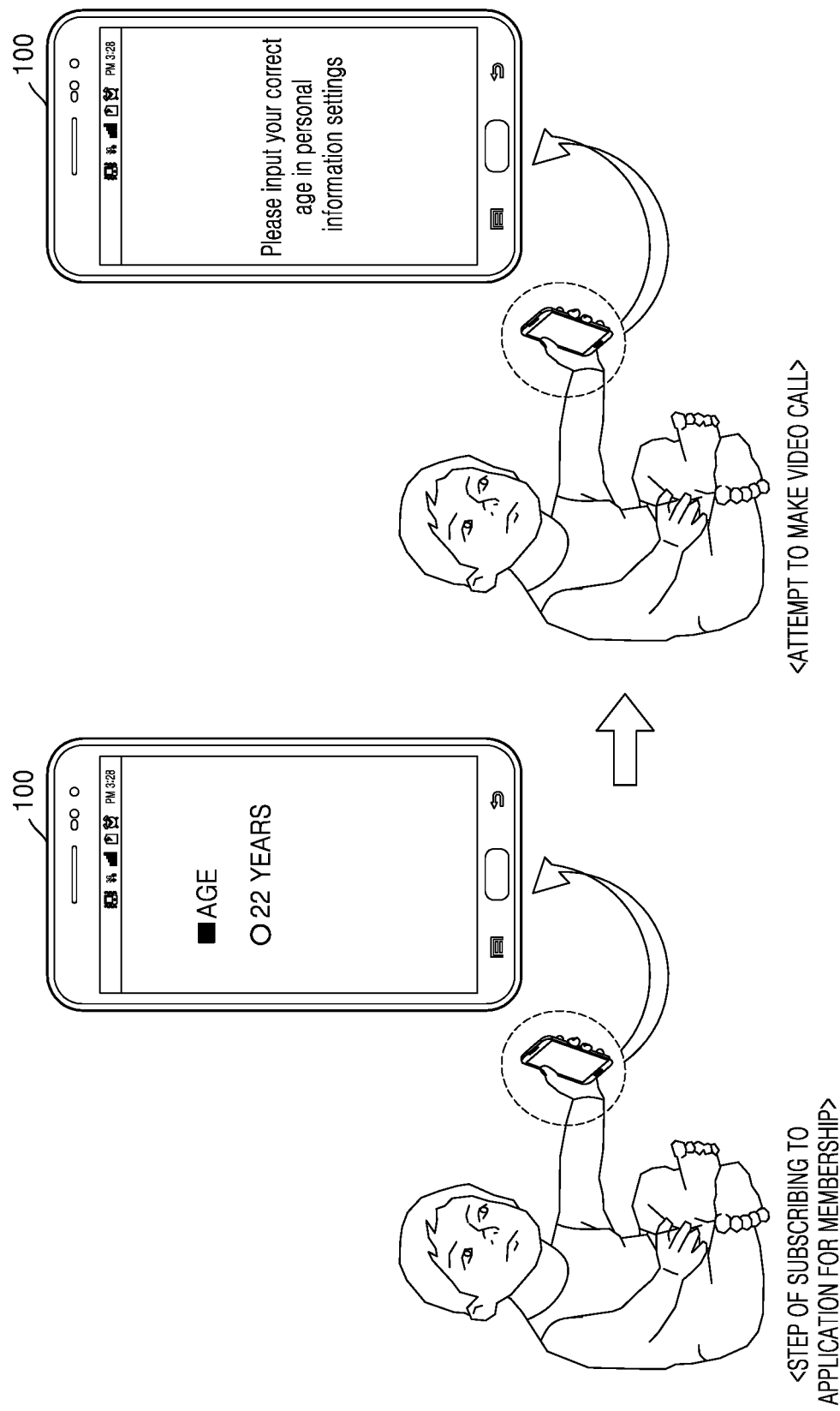
FIG. 10B is a diagram for describing a process of detecting a bad user for age and restricting the bad user, according to an embodiment.

FIG. 10B is a diagram for describing a process of detecting a bad user for age and restricting the bad user, according to an embodiment.

Referring to FIG. 10B, at a step of subscribing an application of the first user of the first terminal 100 for a membership, the first terminal 100 may display an execution screen for receiving age information of the first user. The first user may input age information other than his/her age information on the execution screen. For example, although the first user is 7 years old, the first user may input 22 years as age information on the execution screen through which the age information is input.

Next, the first user of the first terminal 100 may attempt to make a video call with a user of a second terminal on the execution screen of the application. In this case, the first terminal 100 may request the first user of the first terminal 100 for a facial image on the execution screen of the application in order to establish a video call session with the second terminal. According to the request for the facial image, when the first terminal 100 obtains the facial image of the first user, the first terminal 100 may extract facial feature points of the first user from the facial image of the first user. The first terminal 100 may predict that the first user is a bad user for age by applying distribution information of the facial feature points of the first user to a learning model for bad user identification for age. According to a result of the predicting, the first terminal 100 may display a warning message on the execution screen of the application. As shown in FIG. 10B, the first terminal 100 may display a message with the phrase "Please input your correct age in personal information settings".

Figure 11A:
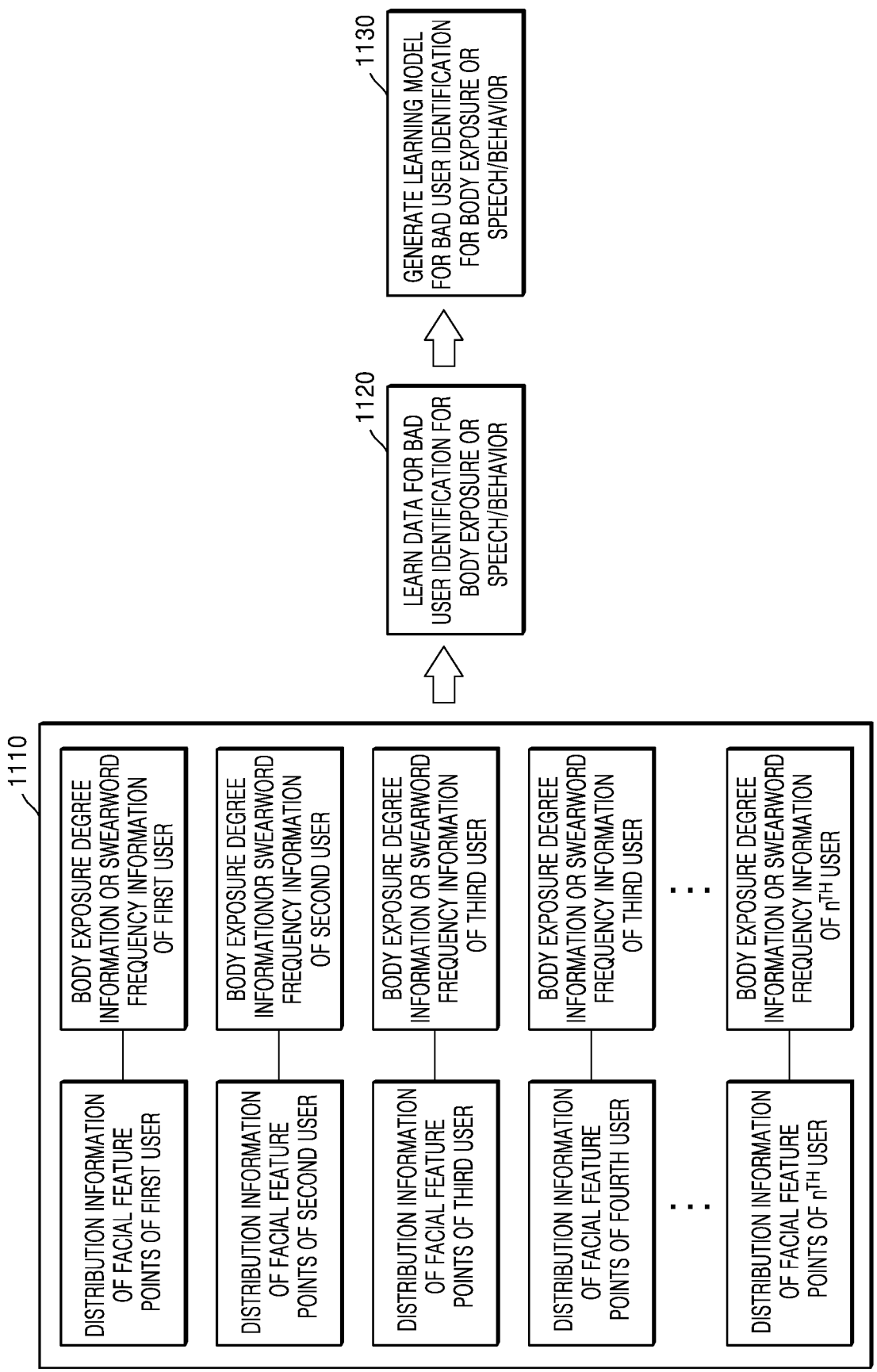
FIG. 11A is a diagram for describing a process of generating a learning model for bad user identification for body exposure or speech/behavior, according to an embodiment.

FIG. 11A is a diagram for describing a process of generating a learning model for bad user identification for body exposure or speech/behavior, according to an embodiment.

Referring to 1110 of FIG. 11A, the server 200 may receive a video or a video stream of the face of a user from each of a plurality of terminals. Also, the server 200 may receive body exposure degree information or swearword frequency information corresponding to distribution information of facial feature points of the user from each of the plurality of terminals. The body exposure degree information or the swearword frequency information may be information obtained from the user when an application is executed by each of the plurality of users. The server 200 may obtain distribution information of facial feature points of a plurality of users based on the received video or video stream. The server 200 may store the distribution information of the facial feature points of the plurality of users and body exposure degree information or swearword frequency information corresponding to the distribution information of the facial feature points of the plurality of users in the storage 230 of the server 200.

For example, the server 200 may store the distribution information of the facial feature points of each of the plurality of users and the body exposure degree information or the swearword frequency information while each of the plurality of users performs a video call with the other party. The body exposure degree information or swearword frequency information of each of the plurality of users may be paired with the distribution information of the facial feature points of each of the plurality of users and may be stored.

Referring to 1120 of FIG. 11A, the server 200 may learn a correlation between the distribution information of the facial feature points of the plurality of users and the body exposure degree information or the swearword frequency information corresponding to the distribution information of the facial feature points of the plurality of users by calculating information stored in the storage 230 through an artificial neural network. In detail, the server 200 may learn a correlation between distribution information of facial feature points of a $k^{th}$ user and body exposure degree information or swearword frequency information of the $k^{th}$ user (k=1, 2, 3, 4, 5, . . . , n). That is, the server 200 may calculate, through a plurality of layers, input distribution information of facial feature points and body exposure degree information or swearword frequency information corresponding to the input distribution information of the facial feature points and may perform learning based on values obtained as a calculation result.

Referring to FIG. 1130 of FIG. 11A, the server 200 may generate a learning model for bad user identification for body exposure or swearword by training the artificial neural network based on a result of the learning. That is, the server 200 may generate the learning model for bad user identification for body exposure or swearword by reducing an error range according to the result of the learning. Also, the server 200 may update the learning model for bad user identification for body exposure or swearword by learning bad user identification histories of the plurality of users for body exposure or swearword. The learning model for bad user identification for body exposure or swearword may determine whether the first user is a bad user for body exposure or swearword by using only distribution information of facial feature points of the first user.

Figure 11B:
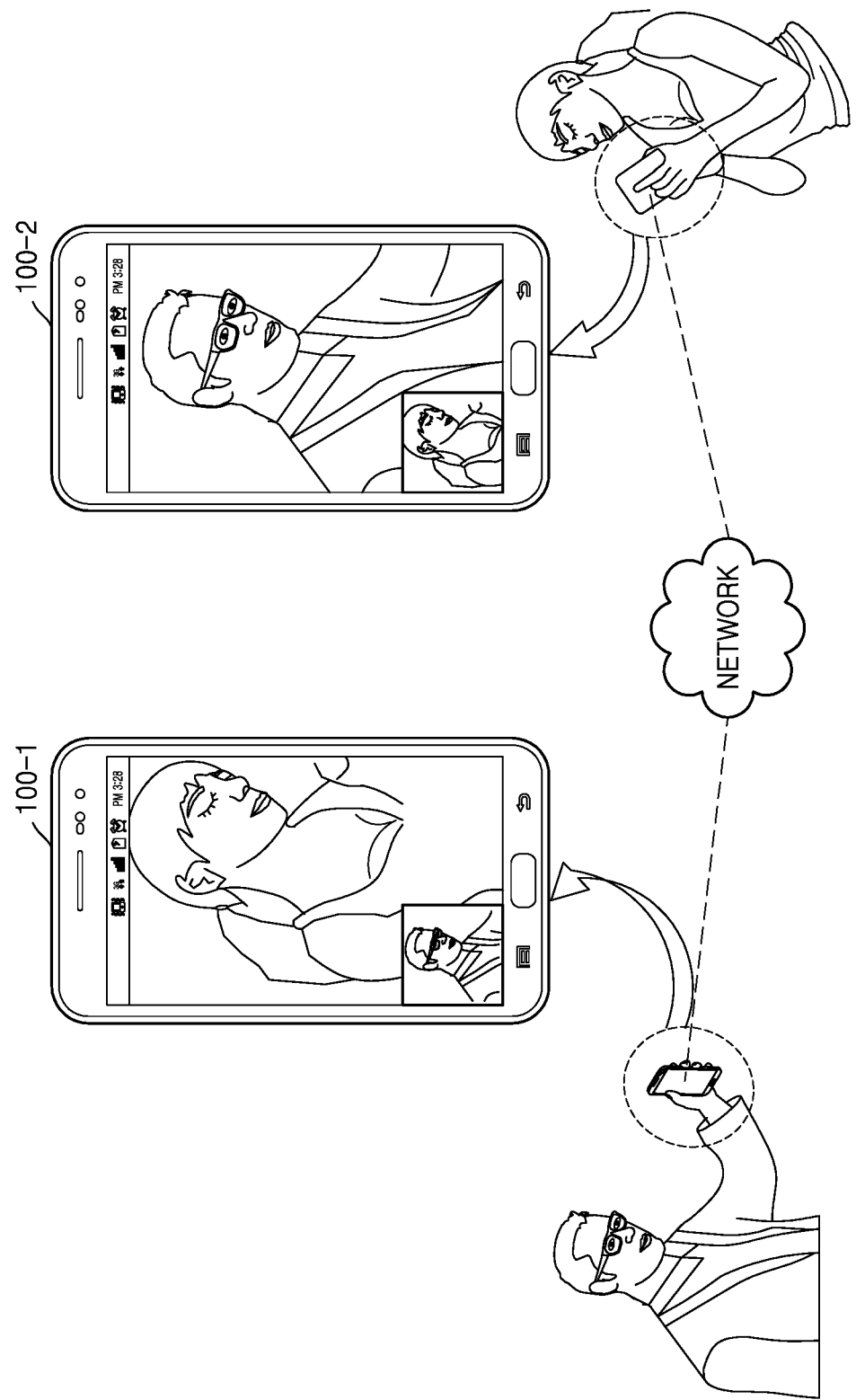

FIGS. 11B and 11C are diagrams for describing a process of detecting a bad user for body exposure and restricting the bad user, according to an embodiment.

Referring to FIG. 11B, a first terminal 100-1 of a first user may establish a video call session with a second terminal 100-2 of a second user. Each of the first terminal 100-1 and the second terminal 100-2 may request each of the first user and the second user for a facial image on an execution screen of an application in order to establish the video call session. It is assumed that a body exposure level of the second user while using the application is higher than a reference body exposure level determined by the application. According to the request for the facial image, when the second terminal 100-2 obtains a facial image of the second user, the second terminal 100-2 may extract facial feature points of the second user from the facial image of the second user. The second terminal 100-2 may predict that the second user is a bad user for body exposure by applying distribution information of the facial feature points of the second user to a learning model for bad user identification for body exposure.

As shown in FIG. 11C, the second terminal 100-2 may display a warning message such as "Please dress appropriately. Otherwise, you may make the other party uncomfortable." on the execution screen of the application. Also, the second terminal 100-2 may display a warning message such as "The video call with the other party will end. Thank you for your use." on the execution screen of the application while automatically ending the video call session. Also, the second terminal 100-2 may mosaic and display an area where the second user is output on the execution screen of the application. Likewise, the first terminal 100-1 may mosaic and display an area where the second user is output on the execution screen of the application.

Also, the second terminal 100-2 may monitor a behavior of the second user and may restrict the execution of the application of the second terminal 100-2 based on a result of the monitoring, without restricting the execution of the application of the second terminal 100-2 right after it is predicted that the second user is a bad user for body exposure.

Figure 12:
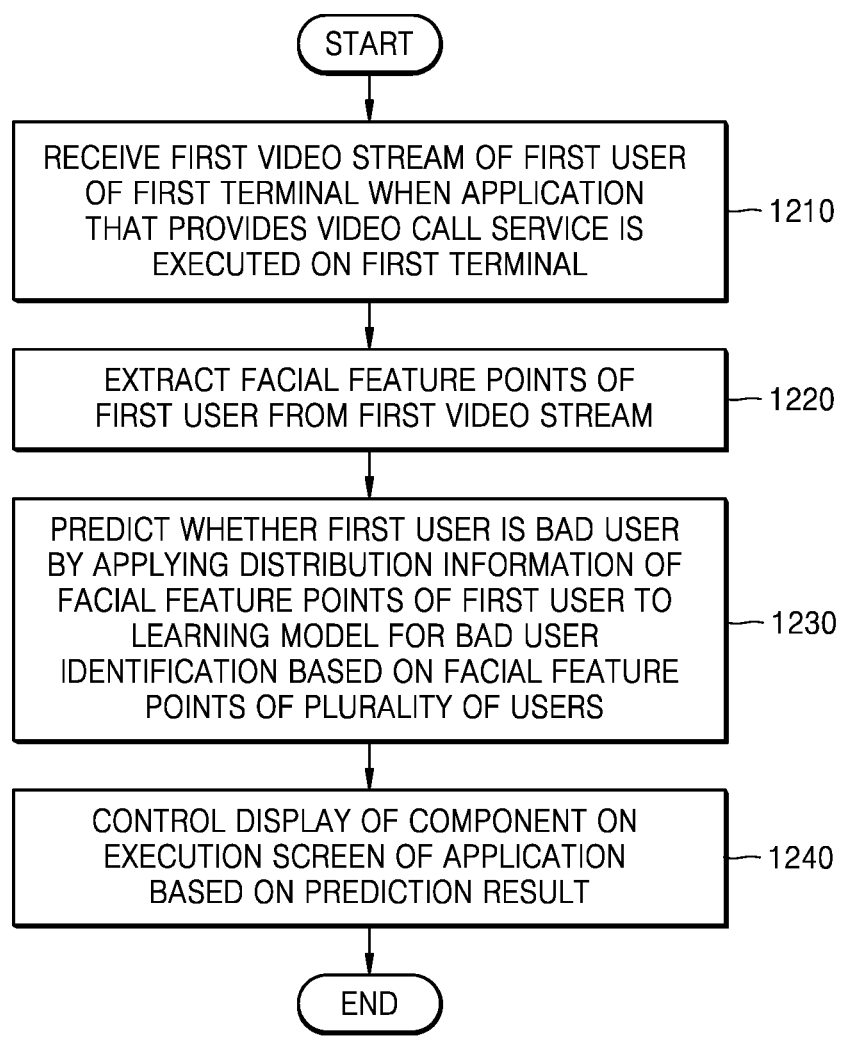
FIG. 12 is a flowchart of a method of providing a video call service by using distribution information of facial feature points of a user, according to an embodiment.

FIG. 12 is a flowchart of a method of providing a video call service by using distribution information of facial feature points of a user, according to an embodiment.

In operation 1210, when an application that provides a video call service is executed on the first terminal 100, the first terminal 100 may receive a first video stream of a first user of the first terminal 100.

In operation 1220, the first terminal 100 may extract facial feature points of the first user from the first video stream.

In operation 1230, the first terminal 100 may predict whether the first user is a bad user by applying distribution information of the facial feature points of the first user to a learning model for bad user identification based on facial feature points of a plurality of users.

In operation 1240, the first terminal 100 may control display of a component on an execution screen of the application based on a result of the predicting.

Embodiments of a method of providing a video call service may be provided as applications or computer programs stored in a computer-readable storage medium so that the first terminal 100 that provides the video call service performs a method of providing the video call service by using distribution information of facial feature points of a user.

Figure 13:
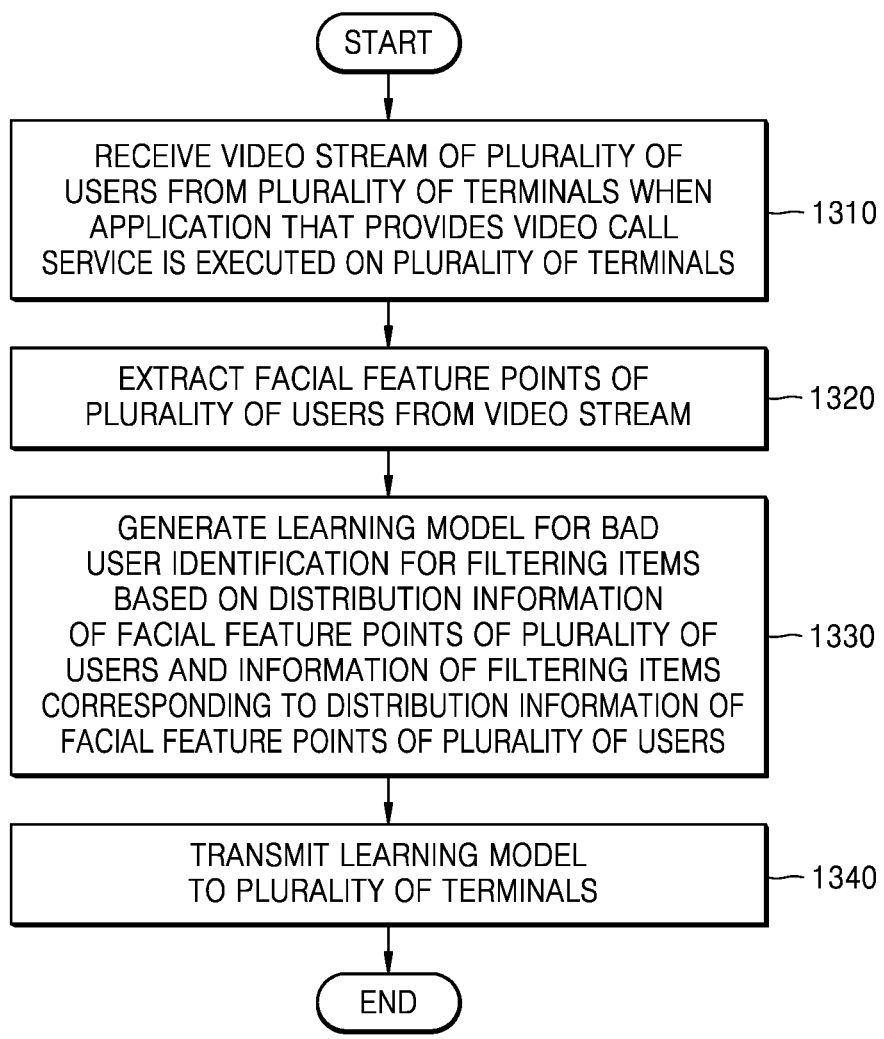
FIG. 13 is a flowchart of a method of generating a learning model for bad user identification by using facial feature points of a plurality of users, according to an embodiment.

FIG. 13 is a flowchart of a method of generating a learning model for bad user identification by using facial feature points of a plurality of users, according to an embodiment.

In operation 1310, when an application that provides a video call service is executed on a plurality of terminals, the server 200 may receive a video stream of a plurality of users corresponding to the plurality of terminals from the plurality of terminals.

In operation 1320, the server 200 may extract facial feature points of the plurality of users from the video stream.

In operation 1330, based on distribution information of the facial feature points of the plurality of users and information of filtering items corresponding to the distribution information of the facial feature points of the plurality of users, the server 200 may generate a learning model for bad user identification for the filtering items.

In operation 1340, the server 200 may transmit the learning model to the plurality of terminals.

Embodiments of a method of providing a video call service may be provided as applications or computer programs stored in a computer-readable storage medium so that the server 200 that provides the video call service performs a method of generating a learning model for bad user identification by using facial feature points of a plurality of users.

While the present disclosure has been particularly shown and described with reference to embodiments thereof, it will be apparent to one of ordinary skill in the art that various modifications and variations may be made in the present disclosure without departing from the spirit or scope of the disclosure. For example, suitable results may be achieved even when the described techniques are performed in a different order, and/or even when components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An application stored in a non-transitory computer-readable storage medium for a first terminal to perform a method of providing a video call service, the method comprising:
    receiving a first video stream of a first user of the first terminal when the application that provides the video call service is executed;
    extracting facial feature points of the first user from the first video stream;
    predicting whether the first user is a bad user by applying distribution information of the facial feature points of the first user to a learning model for bad user identification for filtering items, wherein the learning model is trained based on distribution information of facial feature points of a plurality of users and information of the filtering items corresponding to the distribution information of the facial feature points of the plurality of users, wherein the distribution information of facial feature points of the plurality of users is obtained from a combination of at least two of facial parts of the plurality of users, wherein the filtering items indicate a compliance item of the application; and
    controlling display of a component on an execution screen of the application based on a result of the predicting.

2. The application of claim 1, the method further comprising
    preparing the learning model for bad user identification for the filtering items, trained by using distribution information of the facial feature points of the plurality of users and information of the filtering items corresponding to the distribution information of the facial feature points of the plurality of users.

3. The application of claim 2, wherein the preparing of the learning model for bad user identification for the filtering items comprises updating the learning model for bad user identification for the filtering items by learning bad user identification histories of the plurality of users for the filtering items.

4. The application of claim 2, wherein the preparing of the learning model for bad user identification for the filtering items comprises receiving the learning model for bad user identification for the filtering items from a server that provides the video call service.

5. The application of claim 1, wherein the learning model for bad user identification for the filtering items is trained based on a correlation between the distribution information of the facial feature points of the plurality of users and the information of the filtering items corresponding to the distribution information of the facial feature points of the plurality of users through an artificial neural network.

6. The application of claim 5, wherein the predicting whether the first user is a bad user comprises:
    learning the distribution information of the facial feature points of the first user according to the learning model for bad user identification for the filtering items by using the artificial neural network; and
    predicting whether the first user is a bad user for the filtering items based on a result of the learning.

7. The application of claim 1, wherein the information of the filtering items comprises at least one of gender information, age information, and body exposure degree information and swearword frequency information during the execution of the application,
    wherein, when the information of the filtering items comprises at least two of the gender information, the age information, and the body exposure degree information and the swearword frequency information during the execution of the application,
    the predicting whether the first user is a bad user comprises predicting whether the first user is a bad user for each of the filtering items by applying the distribution information of the facial feature points of the first user to the learning model for bad user identification for each of the filtering items.

8. The application of claim 1, wherein the extracting of the facial feature points of the first user from the first video stream comprises extracting feature points of at least one of eyes, nose, mouth, forehead, and chin that are facial parts of the first user from the first video stream, and
    the predicting whether the first user is a bad user by applying the distribution information of the facial feature points of the first user to the learning model for bad user identification based on the facial feature points of the plurality of users comprises:
    applying distribution information of feature points of a combination of at least two of the facial parts of the first user to the learning model.

9. The application of claim 1, wherein, when it is predicted that the first user is a bad user, the controlling of the display of the component on the execution screen of the application based on the result of the predicting comprises:
displaying a warning message on the execution screen of the application;
mosaicing and displaying an area where the first user is output on the execution screen of the application; and
automatically ending a video call session established with a second terminal, wherein the automatically ending is performed by the first terminal.

10. The application of claim 1, wherein, when it is predicted that the first user is a normal user,
the controlling of the display of the component on the execution screen of the application based on the result of the predicting comprises continuously maintaining a video call session established with a second terminal, wherein the maintaining is performed by the first terminal,
wherein the method further comprises repeatedly performing, in real time or a predetermined cycle, the receiving of the first video stream, the extracting of the facial feature points of the first user, the predicting whether the first user is a bad user, and the controlling of the display of the component on the execution screen of the application of claim 1.

11. The application of claim 1, wherein the filtering items comprise gender item,
wherein the learning model for bad user identification for the gender item is trained based on a correlation between the distribution information of the facial feature points of the plurality of users and information at least one of gender information input when the plurality of users subscribe or log into the application and actual gender information of the plurality of users, through an artificial neural network.

12. The application of claim 1, wherein the filtering items comprise an age item, and
wherein the learning model for bad user identification for the age item is trained based on a correlation between the distribution information of the facial feature points of the plurality of users and information at least one of age information input when the plurality of users subscribe or log into the application, and actual age information of the plurality of users, through an artificial neural network.

13. The application of claim 1, wherein the filtering items comprise at least one of a body exposure degree item or a swearword frequency item,
wherein the learning model for bad user identification for the body exposure degree item or the swearword frequency item is trained based on a correlation between the distribution information of the facial feature points of the plurality of users and information at least one of body exposure degree information and the swearword frequency information while the plurality of users perform a video call with the other party, through an artificial neural network.

14. A server for providing a video call service, the server comprising:
a communication interface configured to communicate with a plurality of terminals that support a video call;
a storage;
a processor; and
a memory configured to store instructions executable by the processor,
wherein the processor is configured to execute the instructions for,
when an application that provides the video call service is executed on the plurality of terminals, receiving a video stream of a plurality of users respectively corresponding to the plurality of terminals from the plurality of terminals,
extracting facial feature points of the plurality of users from the video stream,
based on distribution information of the facial feature points of the plurality of users and information of filtering items corresponding to the distribution information of the facial feature points of the plurality of users, generating a learning model for bad user identification for the filtering items, and
transmitting the generated learning model to the plurality of terminals.

15. The server of claim 14, wherein the processor is further configured to execute the instructions for,
learning a correlation between the distribution information of the facial feature points of the plurality of users and the information of the filtering items corresponding to the distribution information of the facial feature points of the plurality of users by performing a calculation through an artificial neural network, and generating the learning model for bad user identification for the filtering items by training the artificial neural network based on a result of the learning.

16. The server of claim 14, wherein the information of the filtering items comprises at least one of gender information, age information, and body exposure degree information and swearword frequency information during the execution of the application,
wherein, when the information of the filtering items comprises at least two of the gender information, the age information, and the body exposure degree information and the swearword frequency information during the execution of the application,
the processor is further configured to execute the instructions for generating the learning model for bad user identification for each of the filtering items, based on the distribution information of the facial feature points of the plurality of users and the information of each of the filtering items corresponding to the distribution information of the facial feature points of the plurality of users.

17. The server of claim 14, wherein the processor is further configured to update the learning model for bad user identification for the filtering items by learning bad user identification histories of the plurality of users for the filtering items.

18. A non-transitory computer-readable storage medium storing instructions executable by a processor, the non-transitory computer-readable storage medium comprising:
instructions for receiving a first video stream of a first user of a first terminal when an application that provides a video call service is executed on the first terminal;
instructions for extracting facial feature points of the first user from the first video stream;
instructions for predicting whether the first user is a bad user by applying distribution information of the facial feature points of the first user to a learning model for bad user identification for filtering items, wherein the learning model is trained based on distribution information of facial feature points of a plurality of users and information of the filtering items corresponding to the distribution information of the facial feature points of the plurality of users, wherein the distribution information of facial feature points of the plurality of users is obtained from a combination of at least two of facial parts of the plurality of users, wherein the filtering items indicate a compliance item of the application; and
instructions for controlling display of a component on an execution screen of the application based on a result of the predicting.

\* \* \* \* \*